(12) United States Patent
Shih

(10) Patent No.: US 11,045,000 B1
(45) Date of Patent: Jun. 29, 2021

(54) BASE SEAT FOR BED, CHAIR OR SOFA

(71) Applicants: RUOEY LUNG ENTERPRISE CORP., Changhua County (TW); Lung-Tan Shih, Changhua County (TW)

(72) Inventor: Lung-Tan Shih, Changhua County (TW)

(73) Assignees: Ruoey Lung Enterprise Corp., Changhua County (TW); Lung-Tan Shih, Changhua County (TW)

( * ) Notice: Subject to any disclaimer, the term of this patent is extended or adjusted under 35 U.S.C. 154(b) by 11 days.

(21) Appl. No.: 16/710,290

(22) Filed: Dec. 11, 2019

(51) Int. Cl.
| | |
|---|---|
| A47C 3/025 | (2006.01) |
| A47C 19/04 | (2006.01) |
| B60N 2/04 | (2006.01) |
| A47C 21/00 | (2006.01) |
| B60N 2/02 | (2006.01) |

(52) U.S. Cl.
CPC .......... *A47C 3/0255* (2013.01); *A47C 3/0251* (2018.08); *A47C 19/045* (2013.01); *A47C 21/006* (2013.01); *B60N 2/0232* (2013.01); *B60N 2/045* (2013.01); *A61H 2201/0142* (2013.01); *A61H 2201/0149* (2013.01)

(58) Field of Classification Search
CPC ... A47C 3/0251; A47C 3/0255; A47C 21/006; A47C 19/045; B60N 2/045
USPC ......... 297/273, 281, 282, 259.1, 260.2, 314, 297/344.15, 440.22; 108/4, 7, 38, 39; 5/105, 108, 109; 248/143, 144, 394, 395, 248/564, 584, 585, 589, 593, 596; 52/7–10; 472/97, 130, 135; 473/279
See application file for complete search history.

(56) References Cited

U.S. PATENT DOCUMENTS

| | | | | |
|---|---|---|---|---|
| 1,957,005 A | * | 5/1934 | Martin Thum | ...... A47C 3/0255 5/124 |
| 3,125,767 A | * | 3/1964 | Griggs etal. | ............. A47D 9/02 5/109 |
| 3,633,918 A | * | 1/1972 | Smiley | ............... A63B 69/3652 473/279 |
| 4,881,285 A | * | 11/1989 | Zeeb | ........................ A47D 9/02 5/103 |

(Continued)

FOREIGN PATENT DOCUMENTS

FR 2887191 A1 * 12/2006 .......... B60N 2/3011

*Primary Examiner* — Robert Canfield
(74) *Attorney, Agent, or Firm* — Muncy, Geissler, Olds & Lowe, P.C.

(57) ABSTRACT

A base seat for a bed, chair or sofa includes a fixation base, first and second rocking mounts, four arms pivotally connected between the fixation base and the first rocking mount such that a distance between top ends of each paired arms is smaller than a distance between bottom ends of the paired arms, and another four arms pivotally connected between the first and second rocking mounts such that a distance between top ends of each paired arms is smaller than a distance between bottom ends of the paired arms. First and second drive devices respectively drive the first and second rocking mounts to swing leftward and rightward relative to the fixation base and forward and backward relative to the first rocking mount along first and second arc paths with variable inclined angles, such that the base seat has a multidirectional swinging function with desired inclined angles during swinging.

12 Claims, 11 Drawing Sheets

(56) References Cited

U.S. PATENT DOCUMENTS

| | | | | |
|---|---|---|---|---|
| 5,613,662 | A | * | 3/1997 | Blackmore ............ B60N 2/045 248/371 |
| 5,683,306 | A | * | 11/1997 | Tait ................... A63B 69/3652 473/279 |
| 8,240,766 | B2 | * | 8/2012 | Gilbert .................... B60N 2/43 297/344.17 |
| 8,856,982 | B1 | * | 10/2014 | Kalivas ............... A47C 21/006 5/109 |
| 10,638,844 | B2 | * | 5/2020 | Shih .................... A47C 3/0255 |

* cited by examiner

BASE SEAT FOR BED, CHAIR OR SOFA

BACKGROUND OF THE INVENTION

1. Field of the Invention

The present invention relates generally to a furniture and more particularly, to a base seat adapted for being used with a bed, a chair or a sofa and provided with a function of swinging in any direction, i.e. universal direction.

2. Description of the Related Art

Most of the conventional beds, chairs or sofas are configured to be placed on ground or floor in a stationary manner; however, some of the conventional chairs or sofas are designed as being swingable in a single direction. For example, conventional rocking chairs are generally swingable back and forth. After using the conventional rocking chairs having a monotone swinging direction for a certain period of time, users may feel bored and/or fatigue. Further, the seats of the conventional rocking chairs usually have a large inclined angle during swinging. Such feature easily makes users feel uneasy and/or uncomfortable, resulting in that users may be unable to fully relax. In another aspect, swingable beds are seldomly available in commercial market.

SUMMARY OF THE INVENTION

The present invention has been accomplished in view of the above-noted circumstances. It is an objective of the present invention to provide a base seat for being used with a bed, chair or sofa, which can swing in any direction, i.e. universal direction, or at least multi-directions, thereby preventing users from feeling bored and/or fatigue due to a monotone swinging motion.

Another objective of the present invention is to provide a base seat for being used with a bed, chair or sofa, which has proper variable inclined angles during swinging, such that users may feel easy and comfortable to fully relax.

To attain the above objectives, the present invention provides a base seat, which is adapted for being used with a bed, a chair or a sofa, comprising a fixation base, a first rocking mount, a first drive device, a second rocking mount, and a second drive device. The fixation base includes a front frame body and a rear frame body. The first rocking mount is connected with the front frame body of the fixation base via two front suspension arms in a way that each of the two front suspension arms has a top end pivotally connected with the front frame body and a bottom end pivotally connected with the first rocking mount, and a distance between the top ends of the two front suspension arms is smaller than a distance between the bottom ends of the two front suspension arms. The first rocking mount is also connected with the rear frame body of the fixation base via two rear suspension arms in a way that each of the two rear suspension arms has a top end pivotally connected with the rear frame body and a bottom end pivotally connected with the first rocking mount, and a distance between the top ends of the two rear suspension arms is smaller than a distance between the bottom ends of the two rear suspension arms. As such, the first rocking mount is swingable leftward and rightward relative to the fixation base along a first arc path with a variable inclined angle thereof. The first rocking mount comprises a right frame body and a left frame body. The first drive device is disposed between the fixation base and the first rocking mount to drive the first rocking mount to reciprocatingly swing leftward and rightward relative to the fixation base. The second rocking mount is connected with the left frame body of the first rocking mount via two left suspension arms in a way that each of the two left suspension arms has a top end pivotally connected with the left frame body and a bottom end pivotally connected with the second rocking mount, and a distance between the top ends of the two left suspension arms is smaller than a distance between the bottom ends of the two left suspension arms. The second rocking mount is also connected with the right frame body of the first rocking mount via two right suspension arms in a way that each of the two right suspension arms has a top end pivotally connected with the right frame body and a bottom end pivotally connected with the second rocking mount, and a distance between the top ends of the two right suspension arms is smaller than a distance between the bottom ends of the two right suspension arms. As such, the second rocking mount is swingable forward and backward relative to the first rocking mount along a second arc path with a variable inclined angle thereof. The second rocking mount is configured to support the bed, the chair or the sofa thereon. The second drive device is disposed between the first rocking mount and the second rocking mount to drive the second rocking mount to reciprocatingly swing forward and backward relative to the first rocking mount. As a result, the base seat may have a function of swinging in any direction, i.e. universal direction, so as to prevent users from feeling bored and/or fatigue due to a monotone swinging motion, and provide a proper variation of the inclined angle during swinging, such that users may feel easy and comfortable so as to fully relax.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
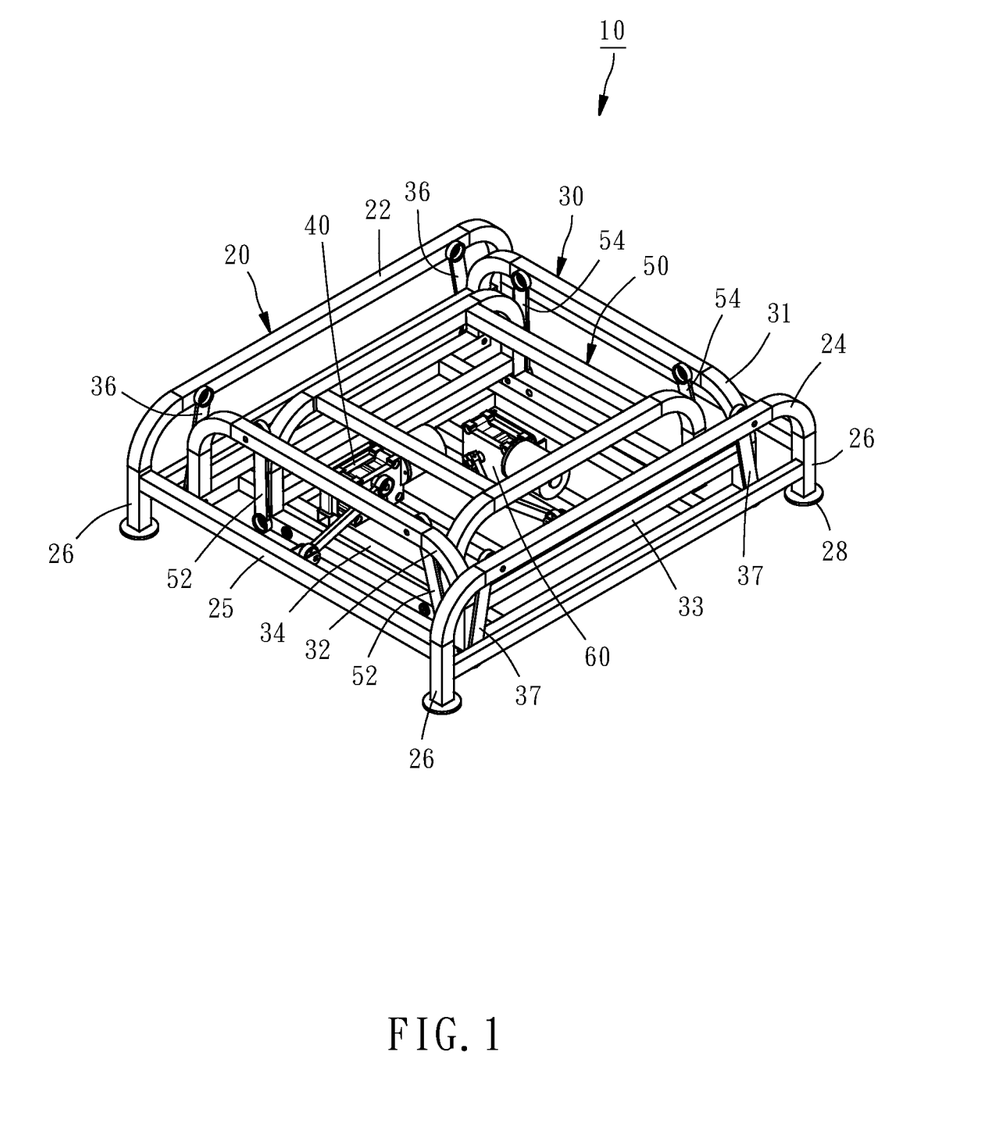
FIG. 1 is a perspective view of a base seat according to a preferred embodiment of the present invention.
Figure 2:
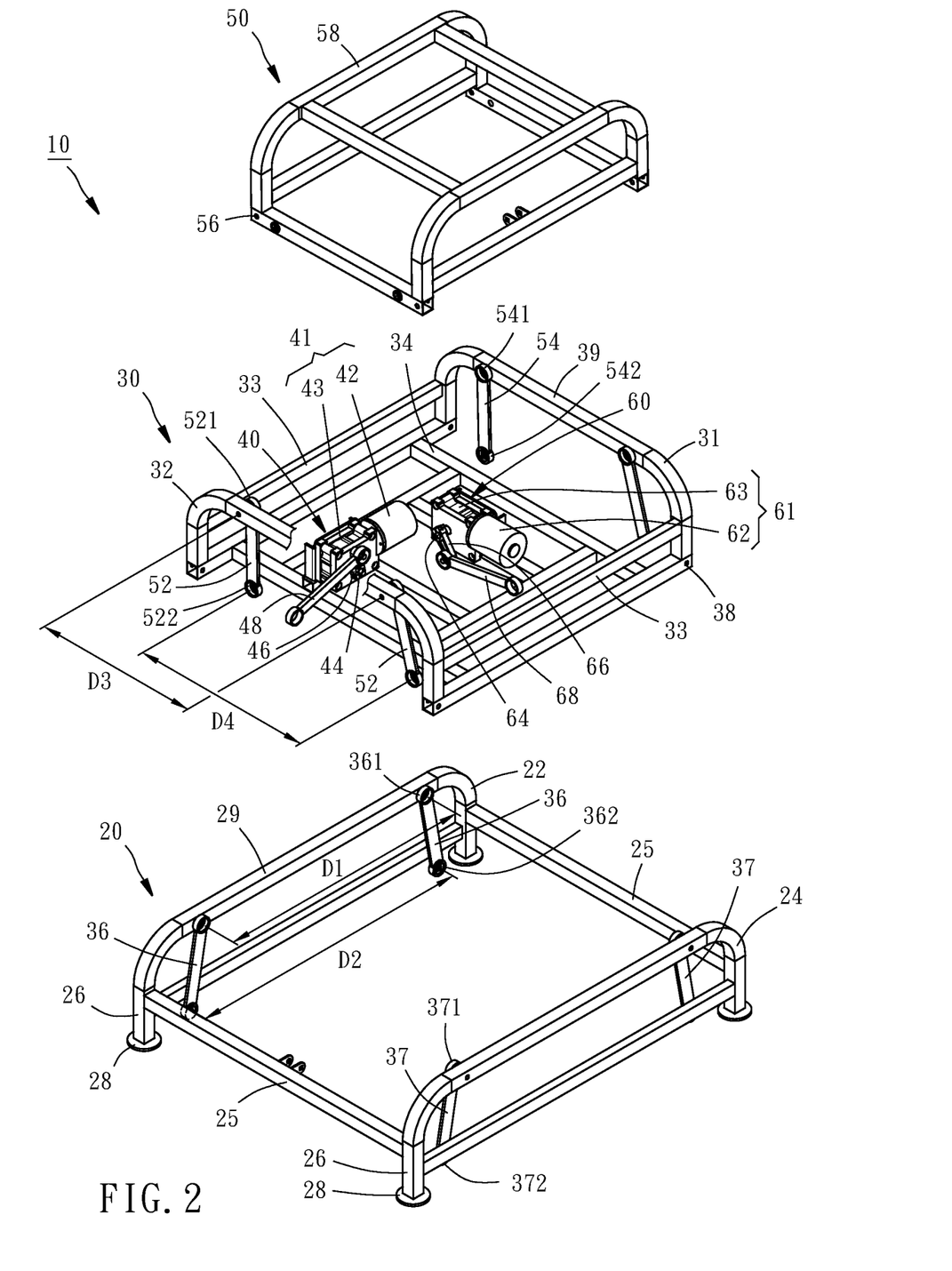
FIG. 2 is an exploded view of the base seat of the preferred embodiment of the present invention.
Figure 3:
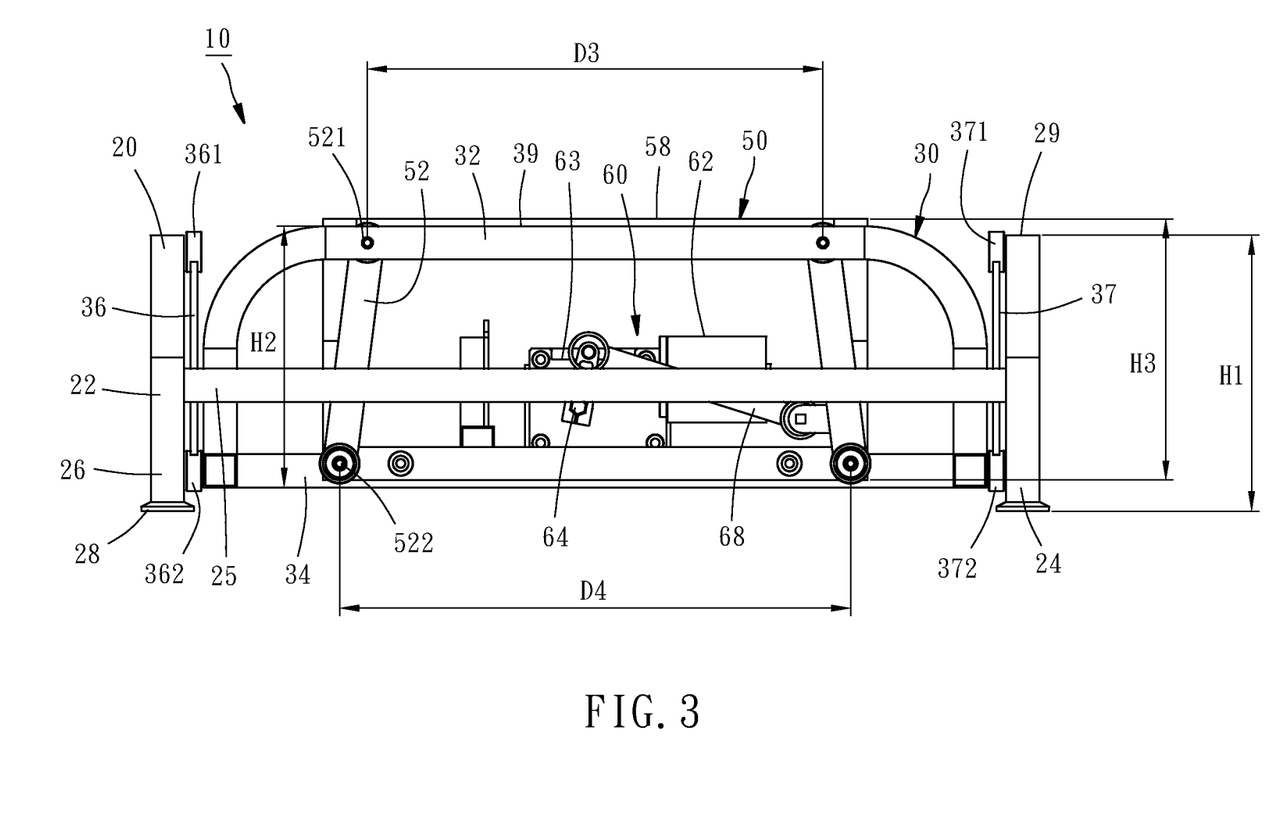
FIG. 3 is a front view of the base seat of the preferred embodiment of the present invention.

The structure and technical features of the present invention will be detailedly described hereunder by a preferred embodiment and accompany drawings. FIGS. 1-3 show a base seat 10 for providing swinging motions in multi-directions or universal direction for a bed (not shown), a chair (not shown) or a sofa (not shown) to be fixedly positioned thereon. The base seat 10 comprises a fixation base 20, a first rocking mount 30, a first drive device 40, a second rocking mount 50, and a second drive device 60.

The fixation base 20 is shaped like a hollow rectangle frame including a front frame body 22, a rear frame body 24, and two connecting rods 25 connecting the front and rear frame bodies 22 and 24 together. The fixation base 20 further includes four support legs 26 adapted for standing on a ground or a flat surface. To avoid slip, a base pad 28 made of plastic material, rubber material or other anti-slip material is disposed to the bottom portion of each support leg 26. As shown in FIG. 3, the fixation base 20 has an overall height H1.

The first rocking mount 30 is shaped like a hollow rectangle frame including a right frame body 31, a left frame body 32, two connecting racks 33 connecting the right and left frame bodies 31 and 32 together, and a bottom rack 34 disposed between the two connecting racks 33. The first rocking mount 30 is connected with the front frame body 22 of the fixation base 20 via two front suspension arms 36, and also connected with the rear frame body 24 of the fixation base 20 via two rear suspension arms 37. Each of the two front suspension arms 36 has a top end 361 pivotally connected with the front frame body 22 and a bottom end 362 pivotally connected with the first rocking mount 30 in such a way that a distance D1 between the top ends 361 of the two front suspension arms 36 is smaller than a distance D2 between the bottom ends 362 of the two front suspension arms 36. Each of the two rear suspension arms 37 has a top end 371 pivotally connected with the rear frame body 24 and a bottom end 372 pivotally connected with the first rocking mount 30 in such a way that a distance D1 between the top ends 371 of the two rear suspension arms 37 is smaller than a distance D2 between the bottom ends 372 of the two rear suspension arms 37. The pivotal portions among the two front suspension arms 36, the two rear suspension arms 37 and the first rocking mount 30, namely the bottom ends 362 and 372, are located at, but not limited to, the four corners 38 of the first rocking mount 30. As such, the first rocking mount 30 is swingable leftward and rightward relative to the fixation base 20 along an arc path, namely a first arc path, in a way that the inclined angle of the first rocking mount 30 will vary during the swinging motion thereof. When the first rocking mount 30 is located at the center of the fixation base 20, the first rocking mount 30 has an overall height H2 substantially corresponding to the height H1 of the fixation base 20 in a way that the top side 39 of the first rocking mount 30 is slightly higher than the top side 29 of the fixation base 20.

The first drive device 40 comprises a first power source 41, a first crank 46, and a first link 48. The first power source 41 is disposed to the bottom rack 34 of the first rocking mount 30 and provided with a first motor 42, a first gear box 43, and a first output shaft 44 extending in a front-and-rear direction. The first gear box 43 transmits an output power of the first motor 42 to the first output shaft 44. The first crank 46 has an end connected with the first output shaft 44. The first link 48 has two ends pivotally connected with the first crank 46 and one of the connecting rods 25 of the fixation base 20, respectively. As such, the first drive device 40 can drive the first rocking mount 30 to reciprocatingly swing leftward and rightward relative to the fixation base 20.

The second rocking mount 50 is shaped like a hollow rectangle frame and connected with the left frame body 32 of the first rocking mount 30 via two left suspension arms 52, and also connected with the right frame body 31 of the first rocking mount 30 via two right suspension arms 54. Each of the two left suspension arms 52 has a top end 521 pivotally connected with the left frame body 32 and a bottom end 522 pivotally connected with the second rocking mount 50 in such a way that a distance D3 between the top ends 521 of the two left suspension arms 52 is smaller than a distance D4 between the bottom ends 522 of the two left suspension arms 52. Each of the two right suspension arms 54 has a top end 541 pivotally connected with the right frame body 31 and a bottom end 542 pivotally connected with the second rocking mount 50 in such a way that a distance D3 between the top ends 541 of the two right suspension arms 54 is smaller than a distance D4 between the bottom ends 542 of the two right suspension arms 54. The pivotal portions among the two left suspension arms 52, the two right suspension arms 54 and the second rocking mount 50, namely the bottom ends 522 and 542, are located at, but not limited to, the four corners 56 of the second rocking mount 50. As such, the second rocking mount 50 is swingable forward and backward relative to the first rocking mount 30 along an arc path, namely a second arc path, in a way that the inclined angle of the second rocking mount 50 will vary during the swinging motion thereof. When the second rocking mount 50 is located at the center of the first rocking mount 30, the second rocking mount 50 has an overall height H3 substantially corresponding to the height H2 of the first rocking mount 30 in a way that the top side 58 of the second rocking mount 50 is slightly higher than the top side 39 of the first rocking mount 30. The top side 58 of the second rocking mount 50 is adapted to support a bed, chair or sofa thereon.

Figure 4:
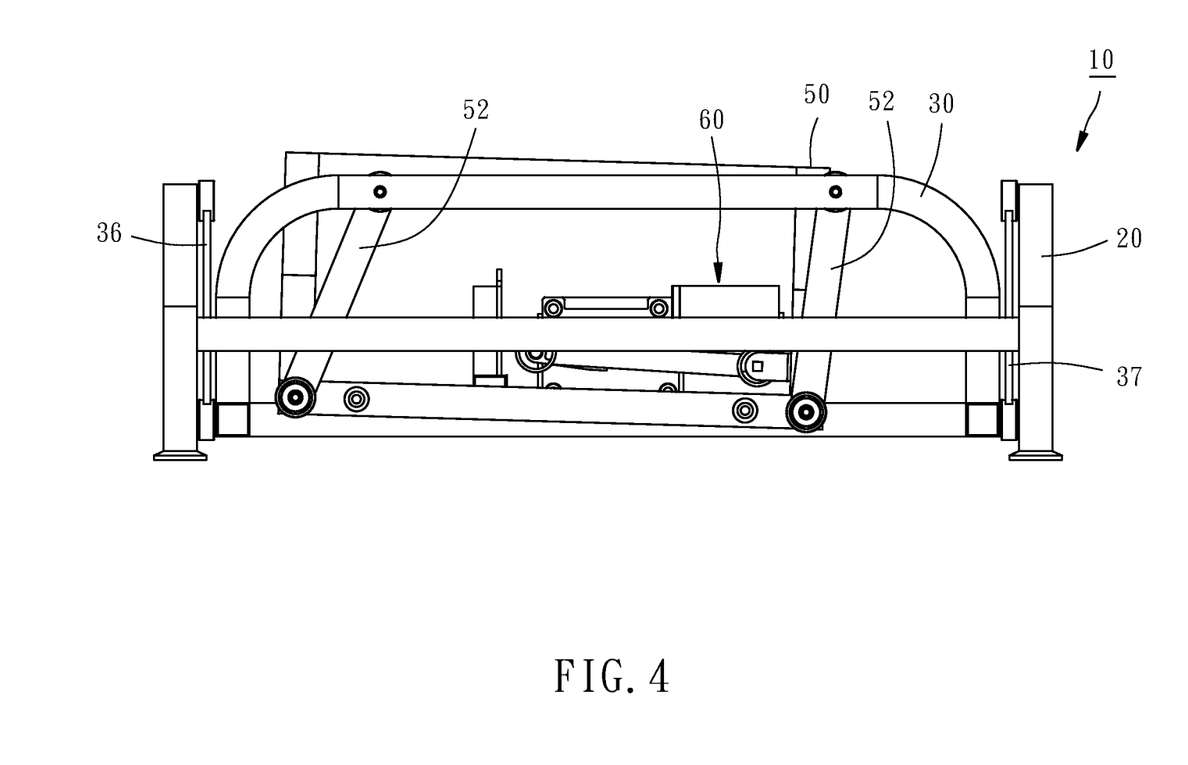
FIGS. 4 and 5 are front views showing swinging motions of the base seat of the preferred embodiment of the present invention.
Figure 5:
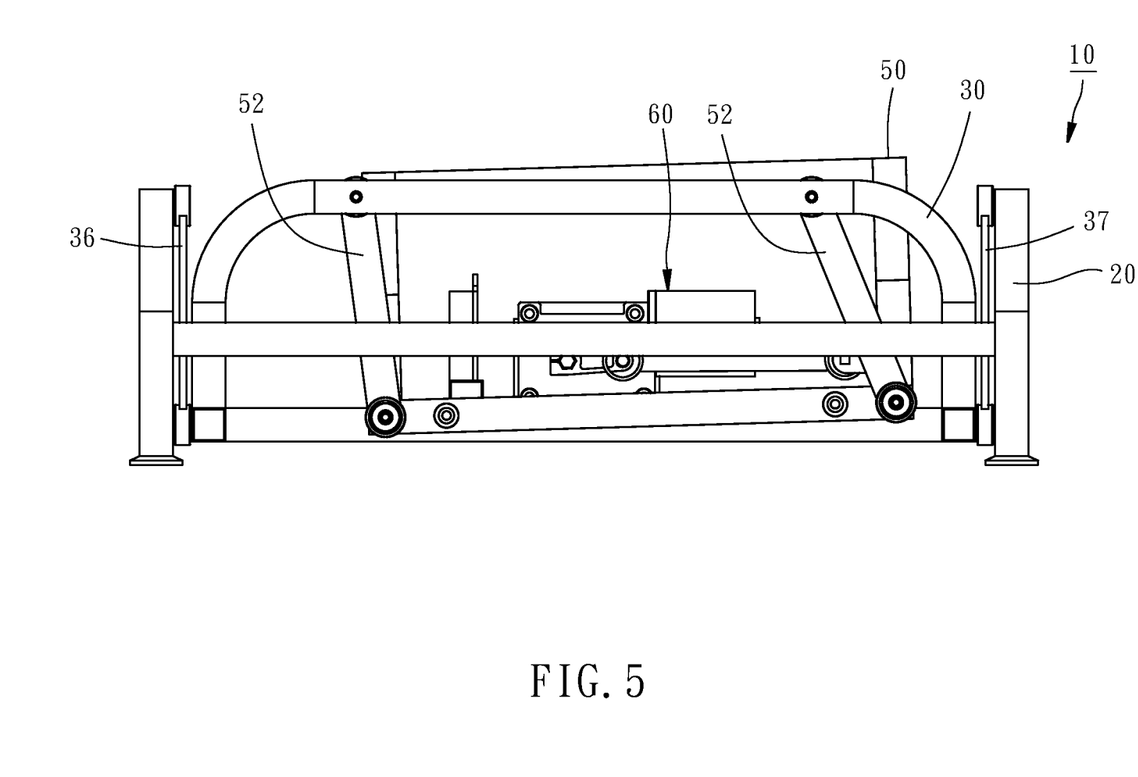

The second drive device 60 comprises a second power source 61, a second crank 66, and a second link 68. The second power source 61 is disposed to the bottom rack 34 of the first rocking mount 30 and provided with a second motor 62, a second gear box 63, and a second output shaft 64 extending in a left-and-right direction. The second gear box 63 transmits an output power of the second motor 62 to the second output shaft 64. The second crank 66 has an end connected with the second output shaft 64. The second link 68 has two ends pivotally connected with the second crank 66 and the second rocking mount 50, respectively. As such, the second drive device 60 can drive the second rocking mount 50 to reciprocatingly swing forward and backward relative to the first rocking mount 30, as shown in FIGS. 4 and 5.

With the above-mentioned structural design, when a bed, chair or sofa is installed on the base seat 10 of the present invention, and more specifically when the bed, chair or the sofa is fixedly mounted on the second rocking mount 50, the base seat 10 can be operated to drive the bed, chair or the sofa to swing forward and backward or to swing leftward and rightward along an arc swinging path with an opening facing upward. In particular, when the first drive device 40 and the second drive device 60 simultaneously work in a condition that the first output shaft 44 has a rotary speed different from that of the second output shaft 64, the base seat 10 can drive the bed, chair or the sofa to swing in any direction, i.e. universal direction, thereby providing variable experiences to users so as to prevent the users from feeling bored and/or fatigue due to a monotone swinging motion. Further, as shown in FIGS. 3-5, by means of the structural feature that the suspension arms 36, 37, 52 and 54 are arranged having narrower top distances and wider bottom distances, when the first rocking mount 30 and the second rocking mount 50 swing, the first rocking mount 30 and the second rocking mount 50 may have proper inclined angles, which won't be too tilted to make users feel uneasy, and won't be too gentle to make users feel mechanical monotonous. In short, the base seat 10 of the present invention conforms to ergonomics, so that the user feels stable and comfortable and can fully relax, thereby achieving the objective of the present invention.

Moreover, since both the first power source 41 and the second power source 61 are mounted to the base rack 34 of the first rocking mount 30, the base seat 10 of the present invention may have a low center of gravity thereof, thereby reducing shake of the base seat 10 when it is operated and effectively improving smoothness of operation.

The feature of motion of the present invention will be detailedly illustrated hereinafter. Because the first and second rocking mounts 30 and 50 in the previous embodiment have similar structures and similar motions, only the motion of the second rocking mount 50 will be described hereinafter for concise illustrative purpose. As shown in FIGS. 4 and 5, since the two left suspension arms 52 have a narrower top distance and a wider bottom distance and the two right suspension arms 54 also have a narrower top distance and a wider bottom distance, the second rocking mount 50 will slightly tilt and the inclined angle of the second rocking mount 50 will slightly vary during the period that the second rocking mount 50 is swinging back and forth. Compared to a swing having a single hanging point, the aforesaid feature of the present invention makes a user feels comfortable and relaxed because the swing having a single hanging point will have a large variation of angle to make user feel excited and fun when it is swinging.

Figure 6:
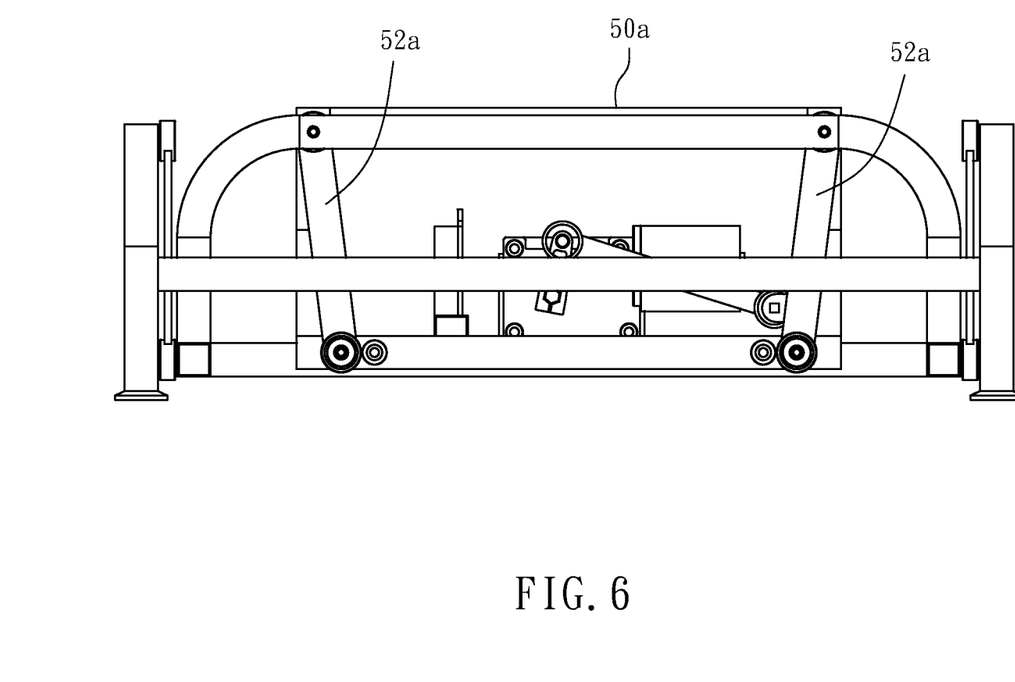
FIG. 6 is a front view of a base seat of a first comparative exemplary embodiment.
Figure 7:
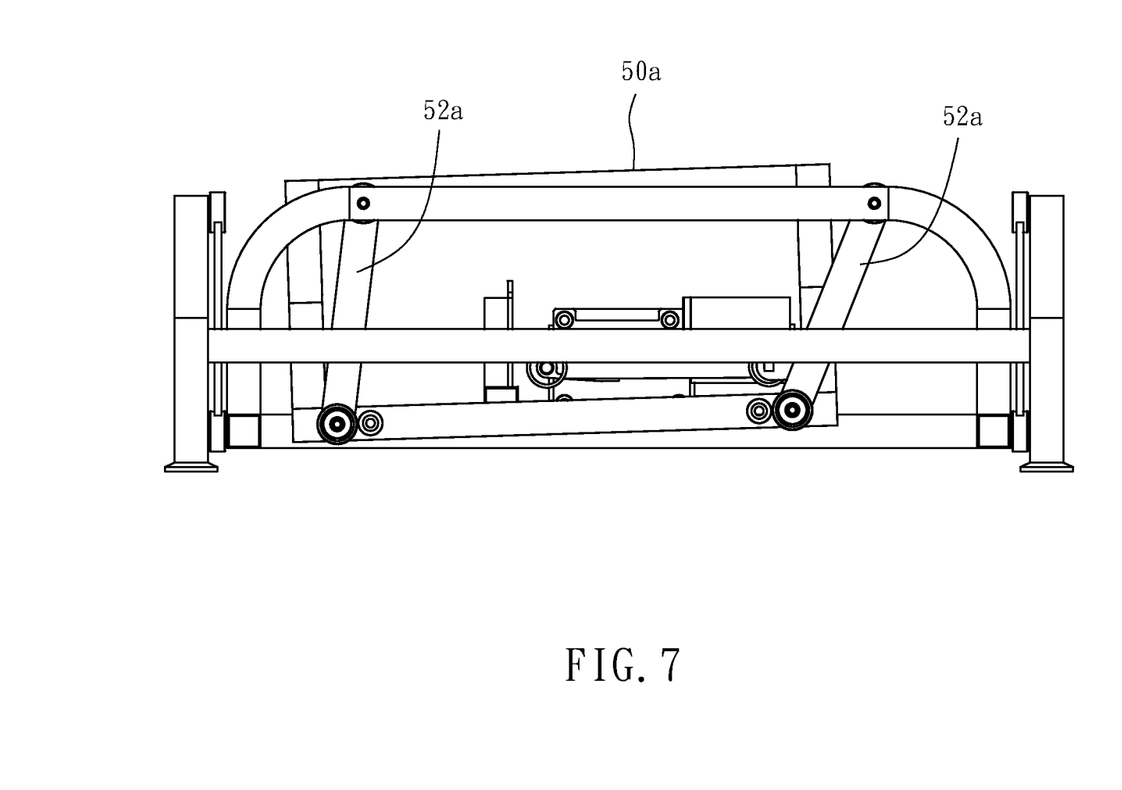
FIGS. 7 and 8 are front views showing swinging motions of the base seat of the first comparative exemplary embodiment.
Figure 8:
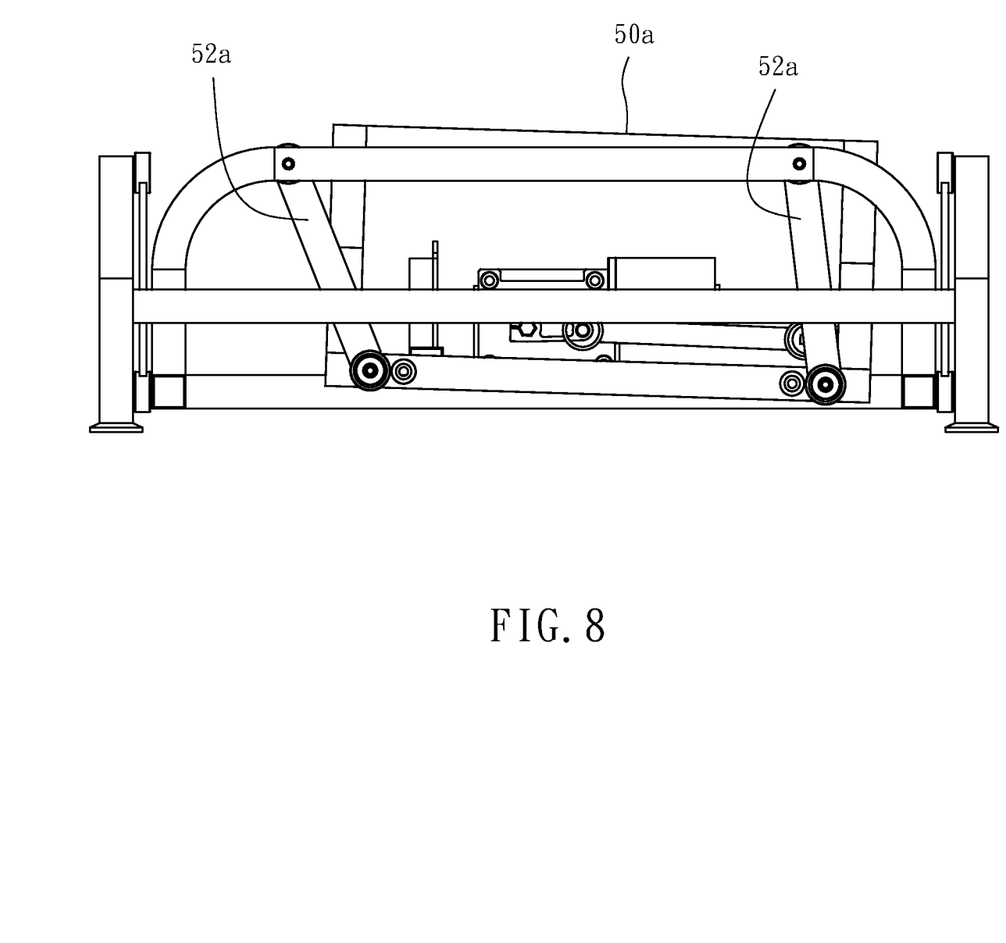
Figure 9:
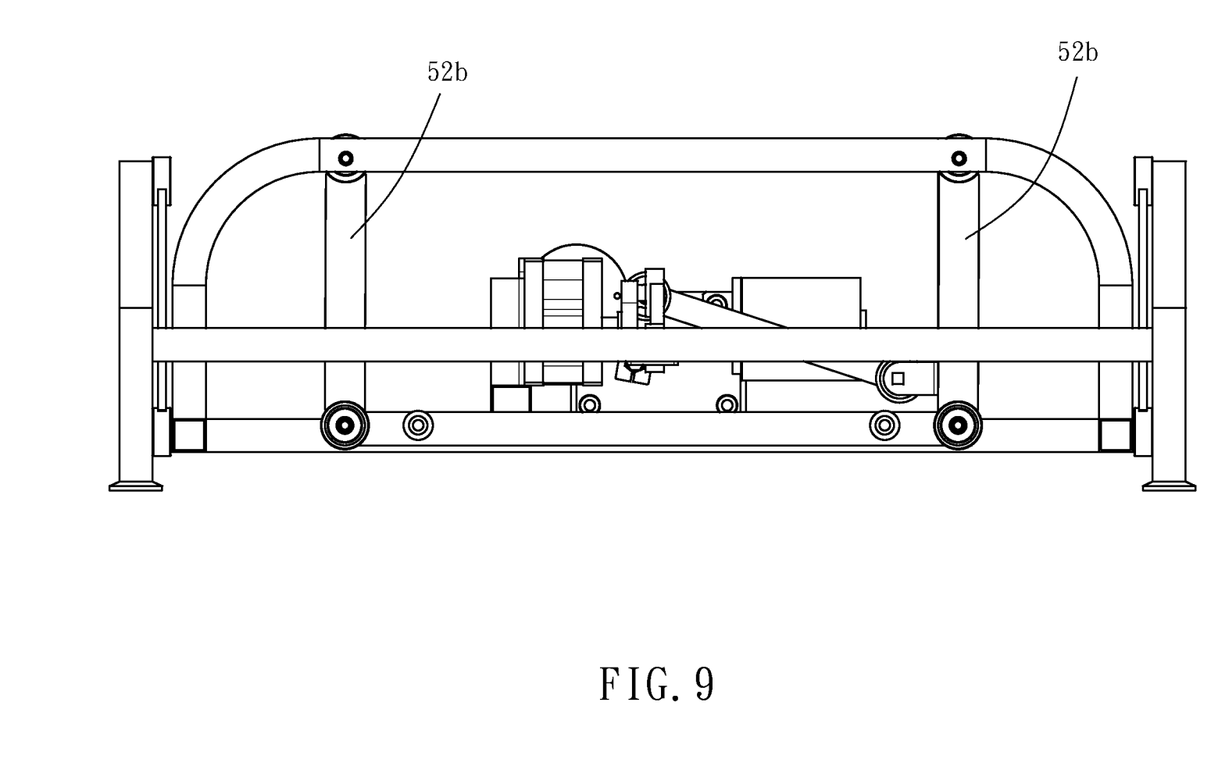
FIG. 9 is a front view of a base seat of a second comparative exemplary embodiment.
Figure 10:
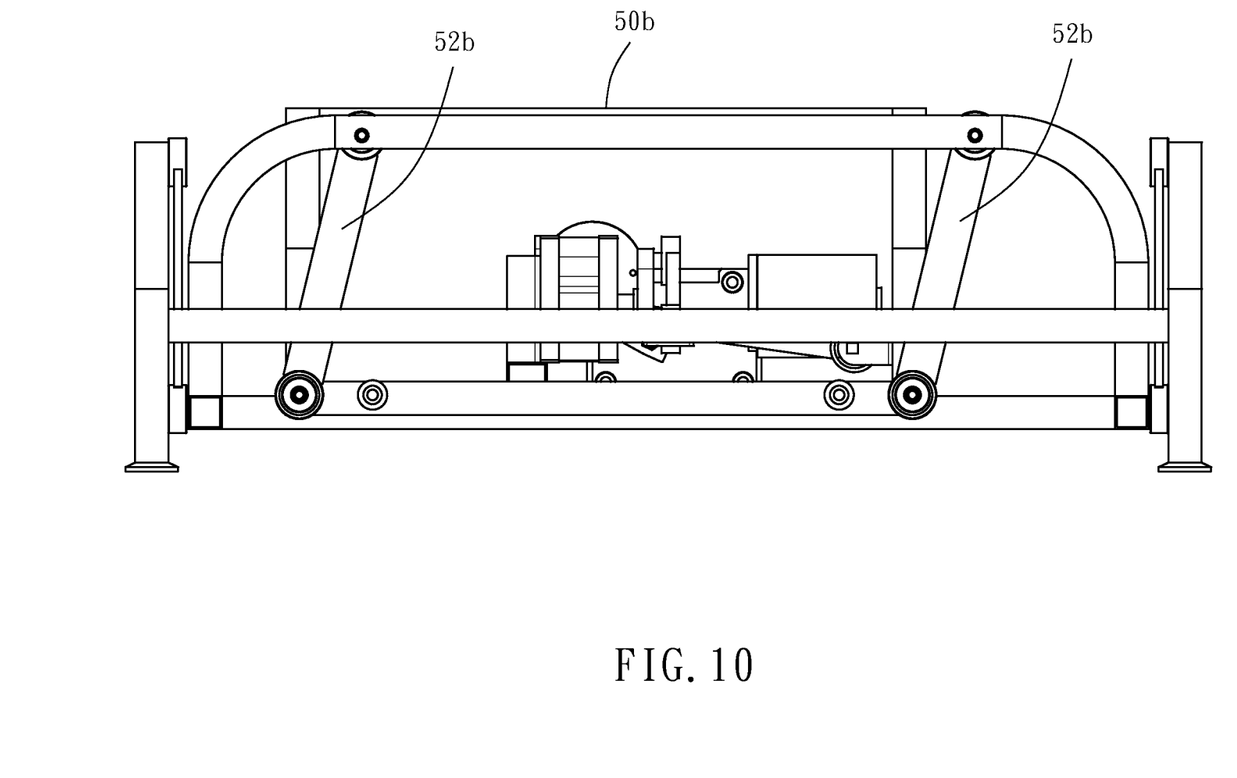
FIGS. 10 and 11 are front views showing swinging motions of the base seat of the second comparative exemplary embodiment.
Figure 11:
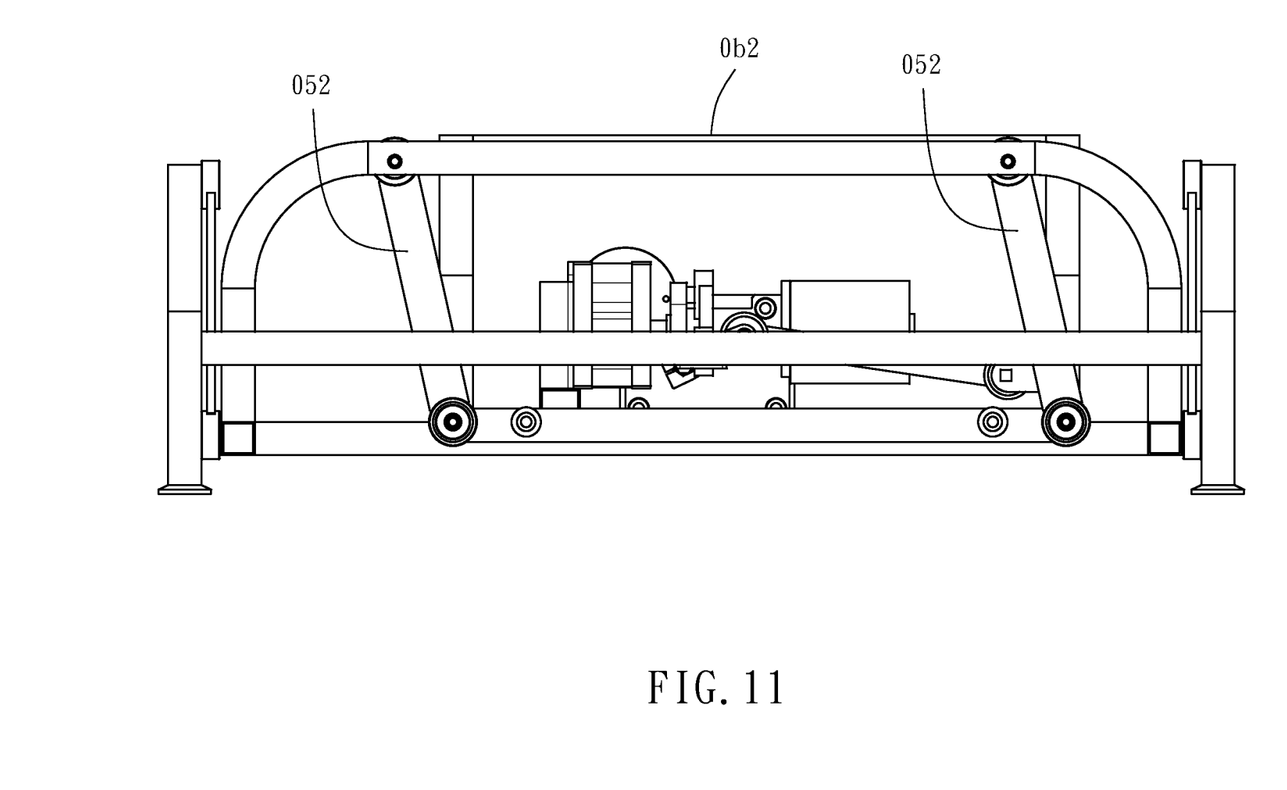

The feature of motion of the base seat of the present invention will become more fully understood from the detailed description of two comparative exemplary embodiments hereinafter. FIG. 6 shows a first comparative exemplary embodiment having a structural feature that the two left suspension arms 52a have a wider top distance and a narrower bottom distance, thereby revealing a different motion. As shown in FIG. 7, when the second rocking mount 50a swings forward, the second rocking mount 50a itself tilts forward, and when the second rocking mount 50a swings backward, the second rocking mount 50a itself tilts backward, as shown in FIG. 8. This feature of motion of the second rocking mount 50a makes user feel that he/she is going to be swung out of the second rocking mount 50a, i.e. feel unstable and uneasy, when the second rocking mount 50a is swinging forward and backward. In contrast, as shown in FIG. 4, when the second rocking mount 50 of the present invention swings forward, the second rocking mount 50 itself tilts backward, and when the second rocking mount 50 swings backward, the second rocking mount 50 itself tilts forward, as shown in FIG. 5. This feature of motion of the second rocking mount 50 makes user feel that he/she is safely held on the second rocking mount 50, i.e. feel stable and easy, when the second rocking mount 50 is swinging forward and backward. Further, FIG. 9 shows a second comparative exemplary embodiment having a structural feature that the two left suspension arms 52b are arranged parallel, thereby revealing a different motion. As shown in FIG. 10, when the second rocking mount 50b swings forward, the second rocking mount 50b itself does not tilt, i.e. has an unchanged angle, and when the second rocking mount 50b swings backward, the second rocking mount 50b itself does not tilt either, as shown in FIG. 11. This feature may make user feel mechanical monotonous, bored, and/or fatigue.

In other words, the present invention is an optimal design resulted from many experimental tests, which may allow the user to fully relax and even partially solve the problem of insomnia. According to experimental tests, when the first rocking mount 30 and the second rocking mount 50 are respectively located at the middle points of their swinging strokes, i.e. the first rocking mount 30 is located at the middle point of the first arc path and the second rocking mount 50 is located at the middle point of the second arc path, an included angle between one of the suspension arms 36, 37, 52 and 54 and a plumb line ranges preferably from 4 to 12 degrees, and more preferably from 5 to 10 degrees, and best preferably from 6 to 8 degrees. In the previous embodiment, the aforesaid included angle is set about 7 degrees. Based on the structural features of the present invention, various modifications to the structure of the base seat 10 may be made. For example, for the first and second drive devices, any mechanism having a reciprocating driving function may be used. Such variations are not to be regarded as a departure from the spirit and scope of the invention, and all such modifications as would be obvious to one skilled in the art are intended to be included within the scope of the following claims.

What is claimed is:

1. A base seat for being used with a bed, a chair, or a sofa, the base seat comprising:
   a fixation base having a front frame body and a rear frame body;
   a first rocking mount connected with the front frame body and the rear frame body of the fixation base via two front suspension arms and two rear suspension arms, respectively, in a way that each of the two front suspension arms has a top end pivotally connected with the front frame body and a bottom end pivotally connected with the first rocking mount in a way that a distance between the top ends of the two front suspension arms is smaller than a distance between the bottom ends of the two front suspension arms, and each of the two rear suspension arms has a top end pivotally connected with the rear frame body and a bottom end pivotally connected with the first rocking mount in a way that a distance between the top ends of the two rear suspension arms is smaller than a distance between the bottom ends of the two rear suspension arms, such that the first rocking mount is swingable leftward and rightward relative to the fixation base along a first arc path with a variable inclined angle thereof; the first rocking mount comprising a right frame body and a left frame body;
   a first drive device disposed between the fixation base and the first rocking mount to drive the first rocking mount to reciprocatingly swing leftward and rightward relative to the fixation base;
   a second rocking mount connected with the left frame body and the right frame body of the first rocking mount via two left suspension arms and two right suspension arms, respectively, in a way that each of the two left suspension arms has a top end pivotally connected with the left frame body and a bottom end pivotally connected with the second rocking mount in a way that a distance between the top ends of the two left suspension arms is smaller than a distance between the bottom ends of the two left suspension arms, and each of the two right suspension arms has a top end pivotally connected with the right frame body and a bottom end pivotally connected with the second rocking mount in a way that a distance between the top ends of the two right suspension arms is smaller than a distance between the bottom ends of the two right suspension arms, such that the second rocking mount is swingable forward and backward relative to the first rocking mount along a second arc path with a variable inclined angle thereof; the second rocking mount being configured to support the bed, the chair or the sofa; and a second drive device disposed between the first rocking mount and the second rocking mount to drive the second rocking mount to reciprocatingly swing forward and backward relative to the first rocking mount.

2. The base seat of claim 1, wherein the first drive device comprises a first power source, a first crank, and a first link; the first power source is disposed to the first rocking mount and provided with a first output shaft extending in a front-and-rear direction; the first crank has an end connected with the first output shaft; the first link has two ends pivotally connected with the first crank and the fixation base, respectively.

3. The base seat of claim 2, wherein the first power source comprises a first motor and a first gear box transmitting an output power of the first motor to the first output shaft.

4. The base seat of claim 1, wherein the second drive device comprises a second power source, a second crank, and a second link; the second power source is disposed to the first rocking mount and provided with a second output shaft extending in a left-and-right direction; the second crank has an end connected with the second output shaft; the second link has two ends pivotally connected with the second crank and the second rocking mount, respectively.

5. The base seat of claim 4, wherein the second power source comprises a second motor and a second gear box transmitting an output power of the second motor to the second output shaft.

6. The base seat of claim 1, wherein a height of a top side of the second rocking mount is higher than a height of a top side of the first rocking mount and a height of a top side of the fixation base.

7. The base seat of claim 1, wherein the bottom ends of the two front suspension arms and the bottom ends of the two rear suspension arms are disposed at four corners of the first rocking mount, respectively.

8. The base seat of claim 1, wherein the bottom ends of the two left suspension arms and the bottom ends of the two right suspension arms are disposed at four corners of the second rocking mount, respectively.

9. The base seat of claim 1, wherein the fixation base comprises four support legs; each of the four support legs has a bottom portion mounted with a base pad.

10. The base seat of claim 1, wherein when the first rocking mount is located at a middle point of the first arc path, an included angle between one of the two front suspension arms and a plumb line ranges from 4 to 12 degrees.

11. The base seat of claim 10, wherein when the first rocking mount is located at the middle point of the first arc path, the included angle ranges from 5 to 10 degrees.

12. The base seat of claim 10, wherein when the first rocking mount is located at the middle point of the first arc path, the included angle ranges from 6 to 8 degrees.

* * * * *